United States Patent [19]

Gremillion

[11] Patent Number: 5,090,765
[45] Date of Patent: Feb. 25, 1992

[54] TRUCK CAB TO BED SEAL

[76] Inventor: Paul J. Gremillion, 210 Elmwood St., Slidell, La. 70460

[21] Appl. No.: 360,047

[22] Filed: Jun. 1, 1989

[51] Int. Cl.⁵ .............................................. B62D 35/00
[52] U.S. Cl. .................................. 296/180.1; 296/166; 49/477
[58] Field of Search ...................... 296/166, 180.1, 183, 296/206; 49/477

[56] References Cited

U.S. PATENT DOCUMENTS

| | | | |
|---|---|---|---|
| 2,832,618 | 4/1958 | Knoll et al. | 49/477 X |
| 3,178,779 | 4/1965 | Clark et al. | 49/477 |
| 3,837,700 | 9/1974 | Van Slyke | 49/477 X |
| 3,897,970 | 8/1975 | Gattenby | 296/166 |
| 4,095,836 | 6/1978 | Pettit | 49/477 X |
| 4,157,201 | 6/1979 | Collins et al. | 49/477 X |
| 4,366,977 | 6/1983 | Davis et al. | 49/477 X |
| 4,371,175 | 2/1983 | Van Dyke, Jr. | 49/477 X |
| 4,505,483 | 3/1985 | Bent, Jr. | 49/477 X |
| 4,848,832 | 7/1989 | Starnes | 296/166 |

Primary Examiner—Margaret A. Focarino
Assistant Examiner—Andrew C. Pike
Attorney, Agent, or Firm—Leon Gilden

[57] ABSTRACT

A truck cab to bed seal and its method for utilization is set forth wherein an elongate inflatable sealing member includes an inner and outer pneumatic chambers to accommodate varying widths within a gap defined by an upper forward surface of a truck bed and a rear surface of a truck cab. The method includes providing such a sealing member and providing the sealing member of a length substantially equal to or greater than the length of a sliding window formed within a truck cab. The seal prevents heated air developed from a roadway and from engine heat to be driected between the gap and enter the cab through the sliding rear window.

1 Claim, 1 Drawing Sheet

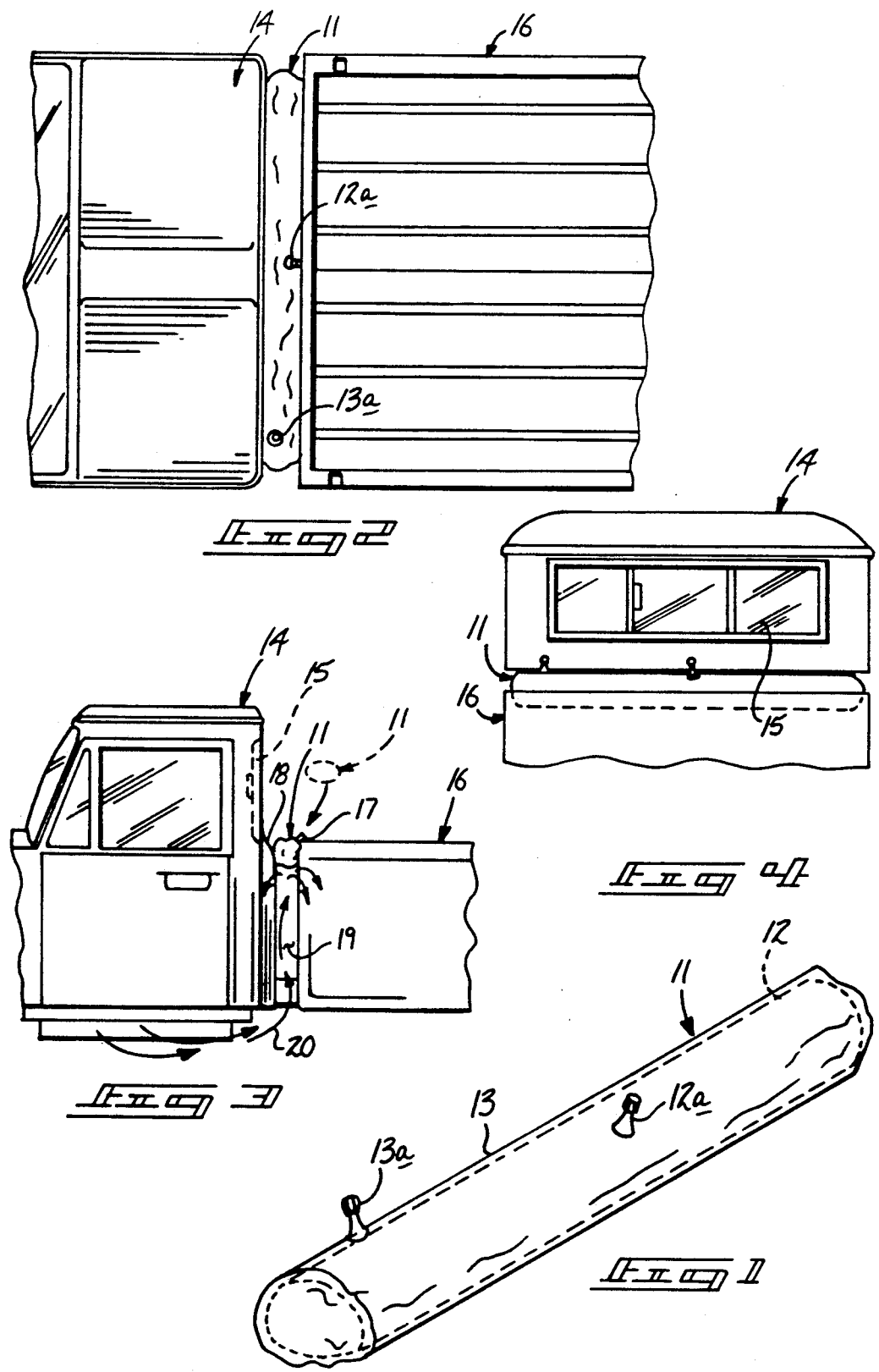

TRUCK CAB TO BED SEAL

BACKGROUND OF THE INVENTION

1. Field of the Invention

The field of invention relates to sealing members, and more particularly pertains to a new and improved sealing member for preventing heated air during days of elevated temperature from entering a truck cab through a sliding rear window.

2. Description of the Prior Art

Various inflatable members have been utilized in the prior art, particularly when a trailer is positioned within a truck bed. The prior art devices, however, have been of interest relative to directing a sealing relationship between the truck bed and a rearwardly oriented trailer, enhancing ventilation by use of a truck cab's sliding rear window. For example, U.S. Pat. No. 4,157,201 to Collins et al. sets forth a door assembly to provide access between an interior pickup passenger compartment or cab and an interior of a camper enclosure with the sealing element extending between the door frame and the camper enclosure, as is typical of the prior art.

U.S. Pat. No. 4,095,836 to Pettit sets forth an inflatable cushion for positioning between a camper portion that extends over a truck cab and the truck cab itself to enhance stability of the camper relative to the truck cab in use.

U.S. Pat. No. 4,366,977 to Davis et al. sets forth a movable partition for dividing up an interior of a cargo transport utilizing inflation tubes to sealingly partition the cargo area.

U.S. Pat. No. 4,371,175 to Van Dyk sets forth an inflatable gasket squeezed between conductive sections of a shielding enclosure with an inner and outer tube for effecting such electrical separation.

U.S. Pat. No. 4,505,483 to Bent, Jr. sets forth an inflatable seal that provides an encircling sealing arrangement between a vehicle body and a door assembly to enable the vehicle body to project exteriorly of an associated door housing the seal.

As such, it may be appreciated that there is a continuing need for a new and improved method of providing a truck cab to bed seal wherein the same addresses both the problems of ease of use and effectiveness in its employment, and in this respect, the present invention substantially fulfills this need.

SUMMARY OF THE INVENTION

In view of the foregoing sealing arrangements now present in the prior art, the present invention provides a truck cab to bed sealing method wherein the same utilizes a dual inflation tube member to effect sealing between a truck bed and an overlying sliding rear window and forwardly oriented truck cab to prevent heated air from being directed between the truck cab and bed through an interior window into the passenger compartment of the cab. As such, the general purpose of the present invention, which will be described subsequently in greater detail, is to provide a new and improved truck cab to bed sealing method.

To attain this, the present invention comprises a method of sealing a gap defined between a rear surface of a truck cab and a truck bed to prevent heated air from entering a sliding rear window positioned above the truck bed in an upper portion of the rear surface of the cab. Inflation members are provided with an inner and outer flexible pneumatic chambers. The inflation member is inflated to inflate both the inner and outer chamber to accommodate various dimensional gap configurations between a variety of truck beds whereupon the inflation member is directed between the truck bed and a truck cab to effect a sealing arrangement preventing heated air from entering the sliding rear window.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved truck cab to bed sealing method which has all the advantages of the prior art sealing methods and none of the disadvantages.

It is another object of the present invention to provide a new and improved truck cab to bed sealing method which may be easily and efficiently manufactured and marketed.

It is a further object of the present invention to provide a new and improved truck cab to bed sealing method which is of a durable and reliable construction.

An even further object of the present invention is to provide a new and improved truck cab to bed sealing method which is susceptible of a low cost of manufacture with regard to both materials and labor, and which accordingly is then susceptible of low prices of sale to the consuming public, thereby making such truck cab to bed sealing methods economically available to the buying public.

Still another object of the present invention is to provide a new and improved method of sealing a truck cab to bed gap to prevent heated air from entering a sliding rear window overlying the truck bed.

These together with other objects of the invention, along with the various features of novelty which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the sealing member of the instant invention.

FIG. 2 is an orthographic top view of the sealing member in position between the truck cab and bed.

FIG. 3 is an orthographic side view taken in elevation of the sealing member positioned between the truck cab and bed.

FIG. 4 is a rear orthographic view of a sealing member positioned between the truck cab and bed.

DESCRIPTION OF THE PREFERRED EMBODIMENT

With reference now to the drawings, and in particular to FIGS. 1 to 4 thereof, a new and improved truck cab to bed sealing method embodying the principles and concepts of the present invention will be described.

More specifically, the truck cab to bed sealing method of the instant invention essentially comprises the providing of an inflation member 11 formed as an elongate axially aligned cylindrical member including an inner inflatable pneumatic chamber 12 axially aligned interiorly of an outer inflatable pneumatic chamber 13. A respective independent inner inflation valve 12a and an independent outer inflation valve 13a provide a manner of directing pressurized air within each of the respective inner and outer chambers 12 and 13. A truck includes a truck cab 14 formed with a conventional interior passenger compartment with a sliding rear window 15 formed about an upper portion of a rear surface of the cab 14. The cab 14 includes a conventional rear surface is spaced forwardly of a truck bed 16 aligned with and spaced rearwardly of the truck cab and underlying the sliding rear window 15. The inflation member 11 is then expanded to inflate both the inner and outer chambers 12 and 13. Expansion of both chambers provides enhanced rigidity and geometrical integrity of the inflation member, as well as its ability to accommodate variations within a gap 19 defined between a forward surface of the truck bed and a rear surface 18 of the cab. The inflation member is positioned between a forward upper surface 17 of the truck bed and the rear surface 18 of the cab. In this manner, heated air 20 directed under the truck during motion of the truck over a roadway is prevented from entering the rear window 15 and thus preventing the heated air directed from the roadway and from the engine compartment of the truck from entering the open rear window 15 through a venturi effect to thus enhance ventilation of the truck cab 14. The inflation member 11 is of a length at least equal to or somewhat greater than the length of the associated sliding rear window 15 to provide an air dam, as illustrated in FIG. 3, preventing the heated air 20 from entering the rear window 15. The inflation member 11 is inserted between the truck bed and the rear surface of the truck cab prior to traverse of the truck overlying a roadway.

As to the manner of usage and operation of the instant invention, the same should be apparent from the above description, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A method of forming a seal between a truck bed and a forwardly oriented truck cab wherein the truck cab is provided with a sliding rear window formed through a rear surface of the truck cab, the rear surface positioned forwardly of the truck bed including an aligned portion of the rear surface underlying the rear window positioned forwardly of the truck bed, the rear surface formed of a predetermined length, and wherein the method comprising the steps of, providing an inflation member of an elongate longitudinally aligned cylindrical configuration, and inflating the inflation member, and positioning the inflation member between a forward surface of the truck bed and a forwardly aligned portion of the rear surface of the truck cab underlying the rear window prior to traverse of the truck overlying a roadway, and wherein the step for providing the inflation member further includes a step of providing an inflation member of a length substantially equal to or greater than the predetermined length of the sliding rear window, and further includes the step of forming the inflation member with an inner inflatable pneumatic chamber within and coaxially aligned with an outer inflatable pneumatic chamber, and each pneumatic chamber being formed with an independent valve to direct pressurized air into each respective chamber.

* * * * *